A. G. BROWN.
Improvement in Disinfecting Water-Closets, Urinals, Gutters, &c.
No. 131,422. Patented Sep. 17, 1872.

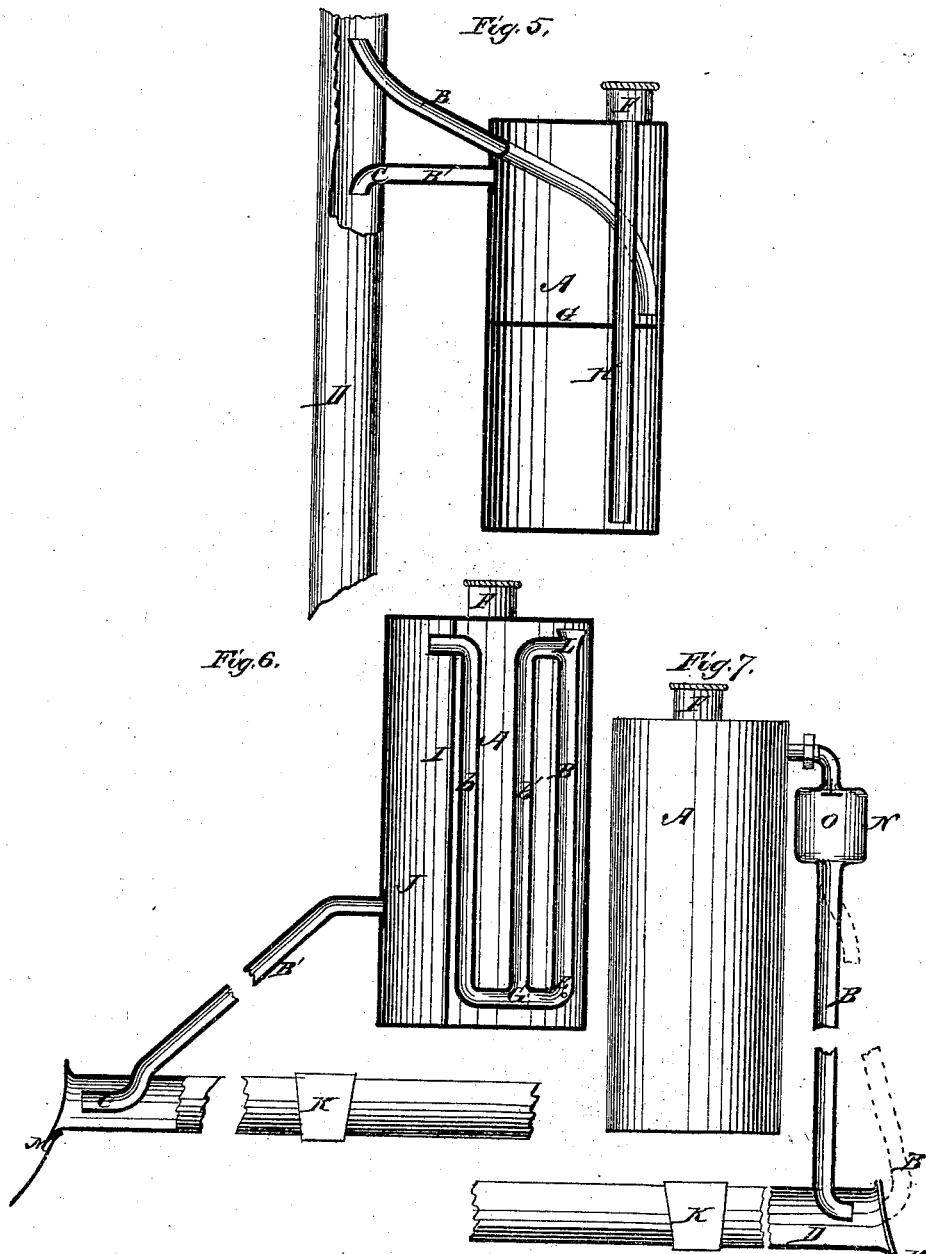

UNITED STATES PATENT OFFICE.

ALFRED GARDINER BROWN, OF BOROUGH OF SOUTHWARK, ASSIGNOR TO JOHN GAMGEE, OF LONDON, ENGLAND.

IMPROVEMENT IN DISINFECTING WATER-CLOSETS, URINALS, GUTTERS, &c.

Specification forming part of Letters Patent No. 131,422, dated September 17, 1872.

*To all whom it may concern:*

Be it known that I, ALFRED GARDINER BROWN, of No. 63 Trinity Square, in the borough of Southwark and county of Surrey, Kingdom of Great Britain, have invented certain "Improvements in Means of Disinfecting Water-Closets, Urinals, as well as Gutters and other Conduits, and Apparatus therefor," of which the following is a specification:

In order to prevent smells from arising from water-closets, urinals, latrines, or other similar conduits, I provide a casing, vessel, or reservoir of either parallelopiped or any other suitable shape, which I fix to or connect with any appropriate part of the water-closet, urinal, or conduit, or fit in any other suitable place or situation. This vessel or reservoir 1 fill with any suitable disinfecting or deodorizing fluid, or in some cases with a disinfecting or deodorizing salt. I cause one or more small pipes or tubes of appropriate length to pass from the said vessel or reservoir into the down-flow or supply-pipe by which the cleansing water is supplied to the water-closet or urinal. I so connect the small pipe or tube by means of stuffing-boxes, flanges, or other suitable description of joint, with the down-flow or supply-pipe, that whenever water shall be caused to pass through the down-flow pipe toward or into the part or parts of the water-closet, urinal, or conduit to be cleansed, some of the disinfecting or deodorizing fluid contained in the vessel or reservoir shall be caused to pass through the small pipe or tube into the supply or down-flow pipe, so that by commingling with the cleansing water such disinfecting or deodorizing liquid shall act simultaneously therewith and contribute to the cleansing of the water-closet, urinal, gutter, or conduit, so as to counteract any offensive smells or effluvia.

In some convenient part of the small pipe or tube a widening or dilatation may be made whereby the disinfecting liquid is delayed in its passage to the down-flow or supply-pipe.

In the annexed sheet of drawing I have shown several arrangements of reservoirs and tubes for disinfecting or deodorizing water-closets in conformity with my method, as hereinbefore described. The whole of the figures are drawn as diagrams, generally representing sectional elevations of the apparatus constructed according to my invention, only one line being in each case given for the thickness of the sides of reservoirs or other vessels, or of pipes or tubes.

Figure 1:
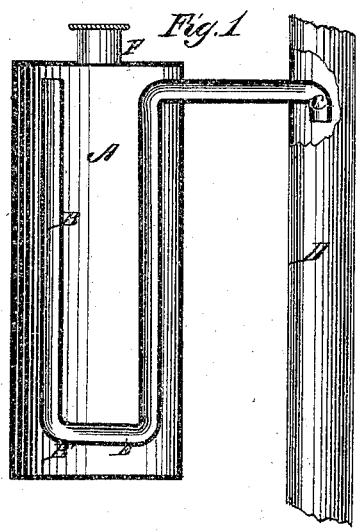
Figure 2:
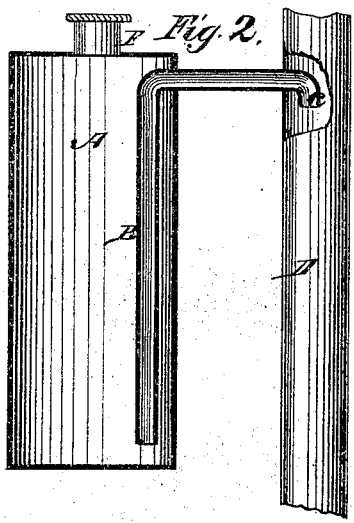
Figure 3:
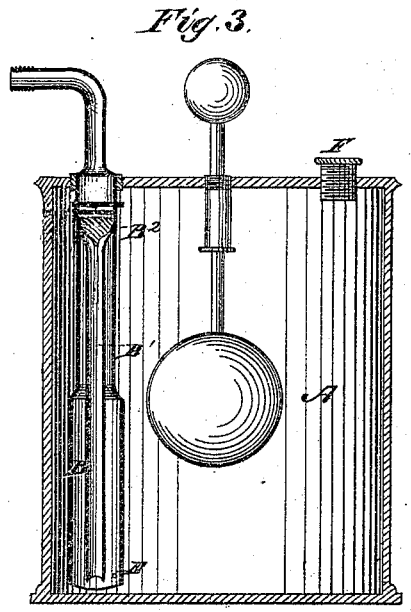
Figure 4:
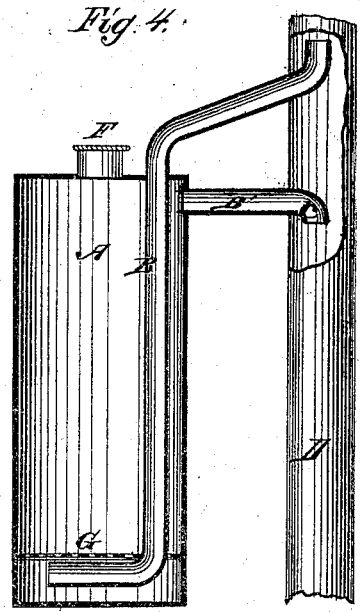

In Figure 1, A is the reservoir or vessel containing the deodorizing or disinfecting fluid; B is the infusion-pipe or measuring-tube, the bottom part $B^1$ of which may be either straight, C-shaped, or coiled, and is furnished with the suction-hole E, through which the disinfecting-fluid enters the pipe. C is the spout leading into the down-flow or supply pipe D. F is the opening or hood through which the deodorizing reservoir or vessel A is fed. As soon as the down-flow or supply-pipe D is filled with water this water acts by suction upon the spout C, so as to draw over a portion of the disinfectant into the pipe D. In Fig. 2 I have shown a variation of the arrangement, Fig. 1, in which a portion of the infusion-tube or measuring-tube B is dispensed with. In this case the open bottom-end of the pipe B is dipped into the deodorizing or disinfecting-fluid. The working of the apparatus is identical with that of the one shown in Fig. 1. In Fig. 3 the tube B is widened out, as shown, to form a measuring-chamber instead of being coiled or otherwise extended, as described in reference to Fig. 1. E is the suction-hole, as before, and $B^1$ an internal tube, provided with a valve, $B^2$, to prevent the overflow of water from the pipe D into the vessel A; the disinfecting-fluid enters the widened tube B by the hole E when the apparatus is at rest; and when the water is caused to flow through the pipe D the fluid, or a part thereof, in the tube B is drawn off by the small tube $B^1$, in the manner described in reference to Figs. 1 and 2. In Fig. 4 I have shown a different arrangement, especially applicable when the disinfecting-fluid will not mix with more than a certain quantity of water, such, for example, as carbolic acid. In this case the pipe B dipped into the disinfecting-fluid is introduced into the down-flow or supply pipe D, and the spout C entering into the same pipe is connected by means of an intermediate tube, $B^1$, with the reservoir A. Thus, as soon as the cleansing water enters the down-flow pipe D a part of it passes forthwith by the pipe B into the bottom of the vessel, and, commingling with the de odorizing or disinfecting fluid in the reservoir, at once raises the level thereof and allows a portion of it to issue into the intermediate tube $B^1$, entering the down-flow pipe D through the spout C, and thereby effecting the deodorizing action. When a disinfecting-salt is employed a perforated diaphragm or sieve-plate, G, shown in dotted lines in this figure, may be employed to support the salt, and the tube B may be extended beneath it, as also shown by dotted lines, and, being perforated, the water introduced by the pipe B will percolate upward through the salt, and the solution thus formed will flow into the pipe D by the pipe $B^1$, in the same manner as before explained in reference to this figure. In Fig. 5 a solid diaphragm or diffusion-plate G is introduced in lieu of the sieve or perforated plate G, (Fig. 4,) and the reservoir or vessel A is fed by means of a tube, H, having its bottom-end or spout below the diaphragm G. The connecting-pipe B here terminates above the diaphragm, and the contents of the reservoir A, commingled with the water, are discharged by the spout C in the same manner as in the last-described arrangements. The arrangements heretofore described are especially applicable to closets, &c., the supply-pipes of which shut off at the cistern. In Fig. 6 I have shown an apparatus constructed according to my invention, connected with a supply or cleansing pipe leading directly to the water-closet, the valve of the supply-pipe being, as is customary, near the closet-pan. By means of a partition, I, an air-chamber, J, is here separated from the reservoir A, and from this chamber the tube $B^1$, with the spout C, leads into the cleansing-pipe D. In the pipe B, fed through the pin-hole E from the reservoir, as in the arrangement shown in Fig. 1, I introduce a partition with an aperture, G. Thus, upon the opening of the valve K the water, flowing through the pipe D, strikes against the spreading-plate M in the closet-pan, and the back pressure caused thereby forces a part of the water by the pipe $B^1$ into the air-chamber J, compressing the air therein, and thereby the fluid in the tubes $b$ $b^1$ will be pushed back and partly discharged into the reservoir at L. Upon the closing of the valve K the water in the air-chamber J will flow back toward the closet-pan M and draw over the fluid which from the pipe B has flowed through the aperture G into $b$ and $b^1$ in the interval; and this fluid will thence issue through $b$ into J, and from the air-chamber through $B^1$ into D.

In Fig. 7 the reservoir A is shown in elevation, and the rest of the apparatus in section. In this arrangement the tube B leading from the closet-pipe D to the reservoir A is dilated at N and furnished with a valve, O. As soon as the cleansing water is admitted into the pipe D through the valve K, the valve O will be pushed upward by the water rising in the pipe B in the manner described with reference to the tube $B^1$, Fig. 6, and thus preclude the latter from entering the reservoir. After the closing of the valve K the column of water in the pipe B flows off, the valve O drops, and the disinfecting-fluid is drawn down the pipe B into the pipe D, as before. The pipe B may, if preferred, be carried from the valve O direct to the spreading-plate M, instead of to the pipe D, as shown in dotted lines.

Having now described the nature of my said invention and illustrated the same in the accompanying sheet of drawing, I wish it to be understood that I do not claim the use of reservoirs or vessels of any particular shape for disinfecting or deodorizing water-closets, urinals, or other conduits; but

What I do claim, is—

1. The use or employment of pipes or tubes connecting a reservoir or vessel containing disinfecting or deodorizing liquid with the down-flow or supply pipe of water-closets, urinals, or other similar conduits, in the manner hereinbefore described and illustrated in the accompanying sheet of drawing.

2. The use or employment of the mode or manner described hereinbefore, and illustrated chiefly in Figs. 6 and 7 of the accompanying sheet of drawing, of securing the disinfection of water-closets or other conduits, and at the same time preventing the overflowing of the disinfecting-liquid from the disinfecting reservoir or vessel.

A. GARDINER BROWN.

Witnesses:
  W. H. BECK,
  H. C. DAVEY.